United States Patent Office

2,982,720
Patented May 2, 1961

2,982,720

CATALYSTS AND CATALYTIC HYDROCARBON CONVERSION PROCESSES

Alan Arthur Yeo and Roy Turner, Sunbury-on-Thames, England, assignors to The British Petroleum Company Limited, London, England, a British joint-stock corporation No Drawing. Filed Aug. 6, 1957, Ser. No. 676,501

Claims priority, application Great Britain Aug. 8, 1956

13 Claims. (Cl. 208—124)

This invention relates to improved catalysts and to conversion processes employing said catalysts.

Catalysts in which nickel is deposited on alumina are known and the use of such catalysts for the dealkylation of aromatics having long chain alkyl groups has been described. The known manner of preparation of these prior catalysts is the impregnation of alumina by nickel nitrate solution followed by roasting at a temperature sufficient to decompose the nitrate to oxide, said temperature generally being below 500° C. Catalysts so prepared have been found to be of low efficiency for the conversion of aromatics, having one or more ring substituted methyl groups, to benzene.

Catalysts in which nickel is deposited on silica are also known; these catalysts are unsatisfactory for the conversion of toluene to benzene, giving low conversions to benzene under mild conditions and considerable proportions of by-products under more severe conditions.

In our copending United States patent application 635,587 there is described and claimed a process for the production of a catalyst base which comprises depositing nickel, cobalt or iron, in elemental or combined form, on an amphoteric oxide, in either catalytically active form or in a form which, after heat treatment, is catalytically active, and thereafter roasting the treated amphoteric oxide at a temperature above 650° C.

It is an object of this invention to provide a process for the production of improved catalysts. It is a further object to provide improved processes for the conversion of organic compounds. It is a further object to provide an improved process of dealkylation. It is a still further object to provide an improved process for the conversion of toluene to benzene. Other objects will appear hereinafter.

According to the present invention there is provided a catalyst base, suitable for the production of complex catalysts as hereinafter described, said catalyst base being produced by depositing, in a first stage, nickel, cobalt or iron, in elemental or combined form, on an amphoteric oxide, roasting the treated amphoteric oxide at a temperature above 650° C., whereby a catalyst base is formed and extracting the roasted material, preferably in granular form, with an inorganic acid.

Preferably nickel, cobalt or iron is deposited upon the amphoteric oxide to form the catalyst base by impregnating the amphoteric oxide with a solution of a group VIII compound which is decomposable, under the action of heat, to an oxide of nickel, cobalt or iron and thereafter roasting the impregnated amphoteric oxide. Suitably the solution is an aqueous solution of a nitrate, formate or acetate of nickel, iron or cobalt.

Preferably the treated amphoteric oxide is roasted at a temperature within the range 700–1000° C. and preferably the period of roasting lies in the range 1–10 hours.

A suitable amphoteric oxide is alumina; while the temperature of roasting will lie above 650° C., it is necessary that this temperature shall lie below that at which a substantial transition to alpha-alumina occurs during the period of roasting. Preferably the alumina is substantially free of elements other than aluminium and oxygen. Preferably the alumina is treated with the group VIII compound while in the form of either a wet or dry alumina gel. The gel may be prepared by the hydrolysis of an aluminium alkoxide, for example, the iso-propoxide peptised, for example by addition of acetic acid, stirred with an aqueous solution of the group VIII compound, dried at low temperature, for example 140° C., and thereafter roasted at a temperature above 650° C.

Suitable inorganic acids for extracting the roasted material include sulphuric acid, hydrochloric acid, hydrofluoric acid, nitric acid and phosphoric acid. While certain acids may be used in concentrated form, preferably the inorganic acids are employed as aqueous solutions of less than 50% vol. per vol. concentration. Usually 10% by volume aqueous acid will be suitable.

Extraction may be carried out by single or multi-stage operation at room temperature or elevated temperature, temperatures of about 100° C. being preferred. Suitably two volumes of the acid or aqueous acid are used per bulk volume of the roasted material in each extraction stage. An extraction time of 15–30 minutes per stage is generally suitable.

When the acid used in extraction contains a radical which has an adverse effect on catalyst activity, it will be necessary to follow the acid extraction by water washing under conditions such that the content of the acid radical in the catalyst is reduced below a proportion at which this adverse effect is a material consideration.

The material obtained as hereinbefore described is suitable for use as a catalyst, for example, for effecting hydrocarbon conversion reactions and in particular for use as a cracking or polymerisation catalyst. The material is also suitable for use as a base in the production of complex catalysts as hereinafter described and for this reason is described as the "catalyst base." Thus according to a further feature of this invention there is provided a process for the conversion of an organic compound wherein a compound containing a hydrocarbon radical, preferably a hydrocarbon, and capable of molecular fission in the presence of a cracking catalyst, is passed in vapour phase and in the presence or absence of added hydrogen, at elevated temperature over a catalyst base, as hereinbefore described.

According to a further feature of the present invention there is provided a complex catalyst, suitable for use in hydrocarbon conversion processes, said complex catalyst being produced by depositing, upon a "catalyst base" as hereinbefore defined, a catalyst component of known activity for effecting the hydrogenation of unsaturated hydrocarbons.

Suitably the catalyst component deposited upon the catalyst base is platinum, indium, paladium, nickel, iron, cobalt, chromium oxide or molybdenum oxide. The catalyst component is deposited by any of the methods well known in the art. Thus platinum may be deposited by impregnation of the catalyst base with a solution, preferably an aqueous solution, of tetramineplatinous chloride. Chromium oxide or molybdenum oxide may be deposited by impregnation of the catalyst base with a solution, preferably an aqueous solution of respectively, chromium nitrate or ammonium molybdenate, followed by heating to form the oxide. Usually the impregnated catalyst base is roasted at a temperature in the range 350–650° C., the precise temperature being determined according to the nature of the metallic element in the catalyst so deposited.

Preferably nickel, cobalt or iron is deposited upon the catalyst base by impregnating the roasted amphoteric oxide, after extraction with acid, with a solution of a group VIII compound which is decomposable, under the action of heat, to an oxide of nickel, cobalt or iron and thereafter roasting the impregnated amphoteric oxide. Suitably the solution is an aqueous solution of a nitrate, formate or acetate of nickel, iron or cobalt and preferably the amphoteric oxide impregnated therewith is roasted at a temperature in the range 350 to 650° C., and preferably in the range 450 to 550° C. Suitably the period of roasting is 1–10 hours, preferably being about 90 minutes.

Preferably the catalyst base contains, in total, 1–50% by weight of nickel, cobalt or iron, the range 25–40% being particularly preferred, 33% being very suitable. Preferably in the complex catalyst, the total weight of metal deposited on the catalyst base lies in the range 1–30% by weight of the complex catalyst, the range 10–20% by weight being preferred.

The "complex catalyst" of this invention may be employed in any form as known in the art, for example, in granular or pelletted form.

Preferably, before use the complex catalyst is reduced by means of a free hydrogen containing gas. Preferably the catalyst is reduced by hydrogen at a temperature in the range 330–600° C. and preferably at about 500° C. Preferably the period of treatment with hydrogen is 2 to 48 hours.

According to a further feature of this invention there are provided improved processes for the conversion of organic compounds using the complex catalyst hereinbefore described.

Thus the present invention comprises a process for the conversion of an organic compound wherein a compound which either (a) consists solely of carbon and hydrogen atoms or (b) has at least one hydrocarbon radical and at least one non-hydrocarbon radical, said compound being capable of molecular fission in the presence of a cracking catalyst, is passed in vapour phase, and in the presence or absence of added hydrogen, at elevated temperature over a "complex catalyst" as hereinbefore described.

According to a further feature of the present invention there is provided a process for hydrocarbon polymerisation wherein an unsaturated hydrocarbon, preferably a mono-olefin, for example ethylene, is passed in vapour phase and at elevated temperature over a "complex catalyst" as hereinbefore described. Suitable olefins include ethylene, propylene, butene-1, butene-2 and higher mono-olefins, butadiene and other di-olefins, and styrene and other ethylenically unsaturated aryl alkyl hydrocarbons.

According to a further feature of the present invention there is provided a process for the removal of one or more alkyl groups from alkyl-substituted aromatic hydrocarbons and, in particular, for the conversion of said hydrocarbons to benzene, which comprises passing said hydrocarbon in vapour phase in admixture with hydrogen over a "complex catalyst" as hereinbefore described. The process herein described is particularly suitable for the conversion of toluene to benzene since, using the complex catalyst herein described, good yields of benzene are obtained with a low rate of production of by-product.

Hydrocarbons from which alkyl groups can be removed by the process hereinbefore described include toluene, o-, m- and p-xylene, cumene, mesitylene, pseudocumene and diethylbenzene. The process may be applied to hydrocarbon fractions containing one or more of said hydrocarbons, for example coal tar fractions and petroleum disillate fractions obtained by the platforming process.

The complex catalysts according to the invention are also suitable for use in carrying out the hydrogenation of unsaturated hydrocarbons, said hydrocarbons being substituted with non-hydrocarbon radicals or unsubstituted. Thus according to a further feature of this invention there is provided a process wherein an organic compound, having carbon to carbon unsaturation, which either (a) consists solely of carbon and hydrogen atoms, or (b) has at least one hydrocarbon radical and at least one non-hydrocarbon radical, is passed in vapour phase in the presence of hydrogen at elevated temperature over a "complex catalyst" as hereinbefore described.

Suitable ethylenically unsaturated, unsubstituted hydrocarbons include olefins, for example ethylene, propylene, butene-1, butene-2, pentenes, hexens, butadiene and higher olefines, for example, di-isobutylene propylene dimer, propylene trimer, propylene tetramer and di-olefins. Suitable ethylenically unsaturated, substituted hydrocarbons include unsaturated fatty acids, for example oleic acid and linoleic acid; unsaturated alcohols and unsaturated esters. Suitable aromatic hydrocarbons which may be reduced to naphthenes include benzene, toluene, xylenes, ethylbenzene, cumene, pseudo-cumene mesitylene, diphenyl and naphthalene.

Preferred reaction temperatures for the above described hydrogenation reactions lie below 400° C. Pressure may be atmospheric or elevated, preferably lying in the range 200–1000 lbs./sq. in.

The temperatures for hydrogenation of olefins and benzene are preferably in the range 200–300° C. but partial hydrogenation of benzene can be obtained as low as 100° C. and of olefins even lower. For olefins, pressures of 100–300 p.s.i.g. are normally employed, but for benzene, whilst hydrogenation can be obtained at 300 p.s.i.g., pressures of the order of 700 p.s.i.g. are to be preferred.

For the processes for the removal of alkyl groups from alkyl substituted aromatics, hereinbefore described, the preferred reaction temperatures lie in the range 250–500° C. and the preferred pressures lie in the range atmospheric to 200 lbs./sq. in. It will be appreciated that many aromatic feedstocks will be capable of undergoing both hydrogenation and dealkylation reactions according to the conditions of temperature and pressure selected and at selected temperatures and pressures may be caused to undergo both reactions simultaneously. In general an increase in reaction pressure and/or a reduction in reaction temperatures will favour hydrogenation reactions at the expense of dealkylation reactions.

For the dealkylation of toluene the preferred conditions are as follows:

| | |
|---|---|
| Feed rate (liquid space velocity) | 0.3–0.6 |
| Pressure (p.s.i.g.) | 120–160 |
| Temperature (° C.) | 410–440 |
| Hydrogen/toluene mol. ratio | 1.5:1–2.5:1 |

Specific conditions which, in combination, have been found very suitable are:

| | |
|---|---|
| Feed rate (liquid space velocity) | 0.45 |
| Pressure (p.s.i.g.) | 140 |
| Temperature (° C.) | 425 |
| Hydrogen/toluene mol. ratio | 2:1 |

The invention is illustrated but in no way limited with reference to the following examples.

EXAMPLE 1

An alumina gel was prepared by shaking 1600 grams of aluminium iso-propoxide with 3.5 litres of distilled water. Excess aqueous iso-propanol was removed by centrifuging. The moist gel was peptized with 48 ml. of glacial acetic acid and stirred to a smooth consistency whilst adding a solution consisting of 1200 grams of nickel nitrate hexahydrate in 200 ml. of water. This gel was dried at 140° C., crushed and sieved to a mesh size (6–12 British Standard Sieve) and roasted at a temperature of 900° C. for 2 hours. After roasting, 120 ml. of the catalyst base so obtained were heated to 140° C. for 30 minutes and impregnated with a solution of 160 grams of nickel nitrate hexa-hydrate in its own water of crystallisation for 30 minutes in an oven at 110° C. [Ni(NO$_3$)$_2$6H$_2$O is soluble in its own water of crystallisation above 57° C.] The excess solution was poured off and the impregnated base roasted at 500° C. for 90 minutes.

This catalyst is believed to contain ca 33% by weight of nickel in the catalyst base and ca 20% by weight of nickel deposited on the base.

The catalyst ("catalyst A") was heated to 500° C. in a stream of hydrogen for 16 hours and was then ready for use.

EXAMPLE 2

Catalyst A was compared with a series of catalysts in which the manner of preparation of the base was varied, as follows:

*Catalyst B (base).*—Above catalyst base (Example 1) extracted by Soxhlet for 4 hours with 50% vol./vol. aqueous acetic acid at 100° C. and thereafter washed with 6×200 vol. percent washes of water.

*Catalyst C (base).*—Catalyst base (Example 1) extracted twice for 15 minutes and 45 minutes respectively with 10% vol. aqueous sulphuric acid (2 vol./vol. catalyst base) at boiling point, with 6×200% vol. water washes between extractions and thereafter extracted by Soxhlet for 2 hours with distilled water at 100° C.

*Catalyst D (base).*—Catalyst base (Example 1) extracted as for catalyst C except that Soxhlet extraction with distilled water was replaced by 6×200% vol. washes of distilled water at 20° C.

*Catalyst E (base).*—Catalyst base was prepared by roasting at 500° C. for 2 hours followed by 1000° C. for 2 hours, (instead of 900° C. for 2 hours). This catalyst base was extracted twice for 15 minutes and 45 minutes respectively with 2 vol. of 10% vol. sulphuric acid per vol. catalyst base per extraction with 6×200% vol. water washes between extractions. Thereafter the catalyst base was extracted by Soxhlet for 2 hours with distilled water.

The catalyst bases prepared as above were all impregnated with aqueous solutions of nickel nitrate. Catalysts B and C were impregnated as for catalyst A, catalysts D and E with a solution consisting of 150 g. nickel nitrate hexahydrate and 50 ml. water. These complex catalysts are believed to contain ca 33% wt. nickel in the catalyst base and 15–20% wt. nickel deposited on the base.

Demethylation activity of the complex catalysts was assessed by passing toluene over the catalysts at a temperature of 360° C. at a liquid feed rate of 0.25 v./v./hr. and hydrogen/hydrocarbon mole ratio of 2, at atmospheric pressure.

Table

| Catalyst | A | B | C | D | E |
|---|---|---|---|---|---|
| Surface area of base (sq. metres/gram). | 69 | 75 | 84 | (Not determined) | |
| Benzene yield, percent wt. | 17.3 | 18.0 | 35.7 | Less than 1 | 48.7 |
| Selectivity,[1] mol percent | 47.4 | 66.6 | 65.7 | | 81.3 |

[1] Selectivity=Moles benzene produced/100 moles toluene reacted. For single pass operation as above, where benzene yield=$b$% wt. and toluene recovered=$t$% wt. on feed, then:

$$\text{Selectivity} = \frac{100\,b}{0.848\,(100-t)} \text{ mol percent}$$

EXAMPLE 3

A 130 to 150° C. distillation fraction, obtained by "platforming" a naphtha fraction boiling in the range 90 to 170° C., was analysed and found to be of the following composition, by weight:

| | Percent |
|---|---|
| Toluene | 4.4 |
| m- and p-xylene | 70.8 |
| o-xylene | 22.8 |
| Ethylbenzene | 2.0 |

This fraction was passed at 0.43 vol./vol./hour with hydrogen over a complex catalyst at 436° C. and 141 p.s.i.g., the hydrogen/hydrocarbon ratio being about 4:1. The complex catalyst was produced as described for catalyst C in Example 2, except that the extracted catalyst base was impregnated with a solution of 150 grams of nickel nitrate hexa-hydrate in 50 mls. of water, under conditions which, in other respects, were as described.

The yields on feed (percent wt.) were as follows:

| | |
|---|---|
| Benzene | 24.4 |
| Toluene | 16.9 |
| m- and p-xylene | 2.1 |
| o-xylene | 5.4 |

EXAMPLE 4

A 150 to 172.5° C. distillation fraction obtained by "platforming" a naphtha fraction boiling in the range 90 to 170° C., said distillation fraction consisting essentially of $C_9$ aromatics, was passed over a complex catalyst at 0.24 vol./vol./hour, at a temperature of 382° C. and atmospheric pressure with hydrogen at a hydrogen/hydrocarbon ratio of about 4:1. The catalyst was produced as described in Example 3.

The yields on feed (wt. percent) were as follows:

| | |
|---|---|
| Benzene | 9.7 |
| Toluene | 30.8 |
| Xylenes | 30.3 |
| Residual $C_9$ aromatics | 3.4 |

EXAMPLE 5

A hydrofined kerosine extract containing approximately 89% by volume of aromatics was passed over a complex catalyst under the following conditions:

| | |
|---|---|
| Temperature °C | 425 |
| Pressure p.s.i.g | 141 |
| Feed rate v./v./hr | 0.422 |
| Hydrogen/hydrocarbon mol ratio | 4.0 |

The catalyst was prepared as described in Example 3.

Liquid recovery was 79.2% by weight of feed, the composition of the feedstock and of the product being as follows, percentages being by weight.

| | Feed | Product |
|---|---|---|
| Benzene | 0.1 | 2.2 |
| Toluene | 0.3 | 5.4 |
| Xylenes | 3.1 | 14.1 |
| Residue boiling above xylenes | 96.5 | 58.2 |

We claim:

1. A process for the production of a catalyst base which comprises bringing into contact alumina, in catalytically active form with an aqueous solution of a water soluble salt selected from the group consisting of the nitrates, formates and acetates of nickel, cobalt and iron, thereafter roasting the treated alumina at a temperature in the range 700–1000° C. for 1–10 hours and thereafter extracting the roasted alumina with an aqueous solution of an inorganic acid selected from the group consisting of sulphuric acid, hydrochloric acid, hydrofluoric acid, nitric acid and phosphoric acid, at a temperature in the range 90–110° C. for 15–30 minutes.

2. The method of producing a complex catalyst comprising depositing a metal selected from the group consisting of nickel, cobalt, and iron on an amphoteric oxide, said metal being decomposable under the action of heat to the oxide thereof, roasting the treated oxide at a temperature above 650° C., treating the roasted oxide with an inorganic acid to extract a catalyst base, further depositing a metal catalyst compound on said extracted catalyst base, and roasting the deposited catalyst base at a temperature between 350°–650° C.

3. The method of producing a complex catalyst comprising impregnating an amphoteric oxide with a solution of a metal compound selected from the group consisting of nickel, cobalt and iron, said metal being decomposable under the action of heat to the oxide thereof, roasting the impregnated oxide at a temperature above 650° C.

but not in excess of 1000° C., treating the roasted oxide with an inorganic acid to extract a catalyst base, further impregnating the extracted base with solution of a metal compound selected from the group consisting of nickel, cobalt, iron, platinum, indium, palladium, chromium, and molybdenum, and roasting the further impregnated base at a temperature between 350°–650° C.

4. The method of claim 3 wherein the further impregnated catalyst base after being heated to form the desired complex catalyst is reduced by contracting same with a gas containing free hydrogen at a temperature in the range of 350°–600° C.

5. The method of claim 3 in which the solution of a metal compound employed to further impregnate the roasted catalyst base is the same metal employed in the initial impregnation of the amphoteric oxide.

6. The method of claim 3 in which the amphoteric oxide is alumina.

7. The method of claim 5 in which the amphoteric oxide is alumina.

8. The method of claim 5 in the catalyst after treatment with the inorganic acid is reduced by contacting same with a gas containing free hydrogen at a temperature in the range of about 350°–600° C.

9. A process for the catalytic conversion of a petroleum hydrocarbon in a vapor phase at an elevated temperature with a complex catalyst, said complex catalyst being prepared by depositing a metal selected from the group consisting of nickel, cobalt and iron on an amphoteric oxide, said metal being decomposable under the action of heat to the treated oxide at a temperature above 650° C., treating the roasted oxide with an inorganic acid to extract the catalyst base, depositing a metal catalyst component on said extracted catalyst base, and roasting the deposited catalyst base at a temperature between 350°–650° C.

10. A process for the catalytic conversion of a petroleum hydrocarbon in a vapor phase at an elevated temperature with a complex catalyst, said complex catalyst being prepared by impregnating an amphoteric oxide with a solution of a metal compound selected from the group consisting of nickel, cobalt and iron, said metal being decomposable under the action of heat to the oxide thereof, roasting the impregnated oxide at a temperature above 650° C. but not in excess of 1000° C., treating the roasted oxide with an inorganic acid to extract a catalyst base, further impregnating the extracted base with solution of a metal compound selected from the group consisting of nickel, cobalt, iron, platinum, indium, palladium, chromium, and molybdenum, and roasting the further impregnated base at a temperature between 350°–650° C.

11. A process in accordance with claim 10 in which the hydrocarbon is passed over the catalyst at a temperature in the range of 150°–500° C. and at an atmospheric pressure in the range of 1000 lbs. per square inch.

12. A process for the conversion of an alkyl substituted aromatic hydrocarbon to an aromatic hydrocarbon of lower molecular weight which comprises contacting the hydrocarbon in vapor phase in admixture with hydrogen at a temperature in the range of 250°–500° C. and an atmospheric pressure in the range of 200 lbs. per square inch, and a complex catalyst, said complex catalyst being prepared by impregnating and amphoteric metal compound selected from the group consisting of nickel, cobalt and iron, said metal being decomposable under the action of heat to the oxide thereof, roasting the impregnated oxide at a temperature above 650° C. but not in excess of 1000° C., treating the roasted oxide with an inorganic acid to extract a catalyst base, further impregnating the extracted base with solution of a metal compound selected from the group consisting of nickel, cobalt, iron, platinum, indium, palladium, chromium, and molybdenum, and roasting the further impregnated base at a temperature between 350°–650° C.

13. A process in accordance with claim 10 in which the reaction is carried out in the presence of hydrogen.

References Cited in the file of this patent

UNITED STATES PATENTS

| | | |
|---|---|---|
| 2,288,874 | Anderson et al. | July 4, 1942 |
| 2,288,875 | D'Ouville | July 4, 1942 |
| 2,687,370 | Hendricks | Aug. 24, 1954 |
| 2,689,266 | Coonradt et al. | Sept. 14, 1954 |
| 2,721,226 | Ciapetta | Oct. 18, 1955 |
| 2,725,400 | Mercorney | Nov. 29, 1955 |
| 2,748,090 | Watkins | May 29, 1956 |

FOREIGN PATENTS

| | | |
|---|---|---|
| 717,062 | Great Britain | Oct. 20, 1954 |

UNITED STATES PATENT OFFICE
CERTIFICATION OF CORRECTION

Patent No. 2,982,720                  May 2, 1961

Alan Arthur Yeo et al.

It is hereby certified that error appears in the above numbered patent requiring correction and that the said Letters Patent should read as corrected below.

Column 7, line 10, for "contracting" read -- contacting --; column 8, line 18, for "and" read -- an --; same column 8, lines 36 and 37, under the heading "UNITED STATES PATENTS", for 2,288,874    Anderson et al ----- July 4, 1942
     2,288,875    D'Ouville ---------- July 4, 1942 read 2,288,874    Anderson et al ----- July 7, 1942
     2,288,875    D'Ouville ---------- July 7, 1942

Signed and sealed this 17th day of October 1961.

(SEAL)
Attest:

ERNEST W. SWIDER
Attesting Officer

DAVID L. LADD
Commissioner of Patents